Figure 1:
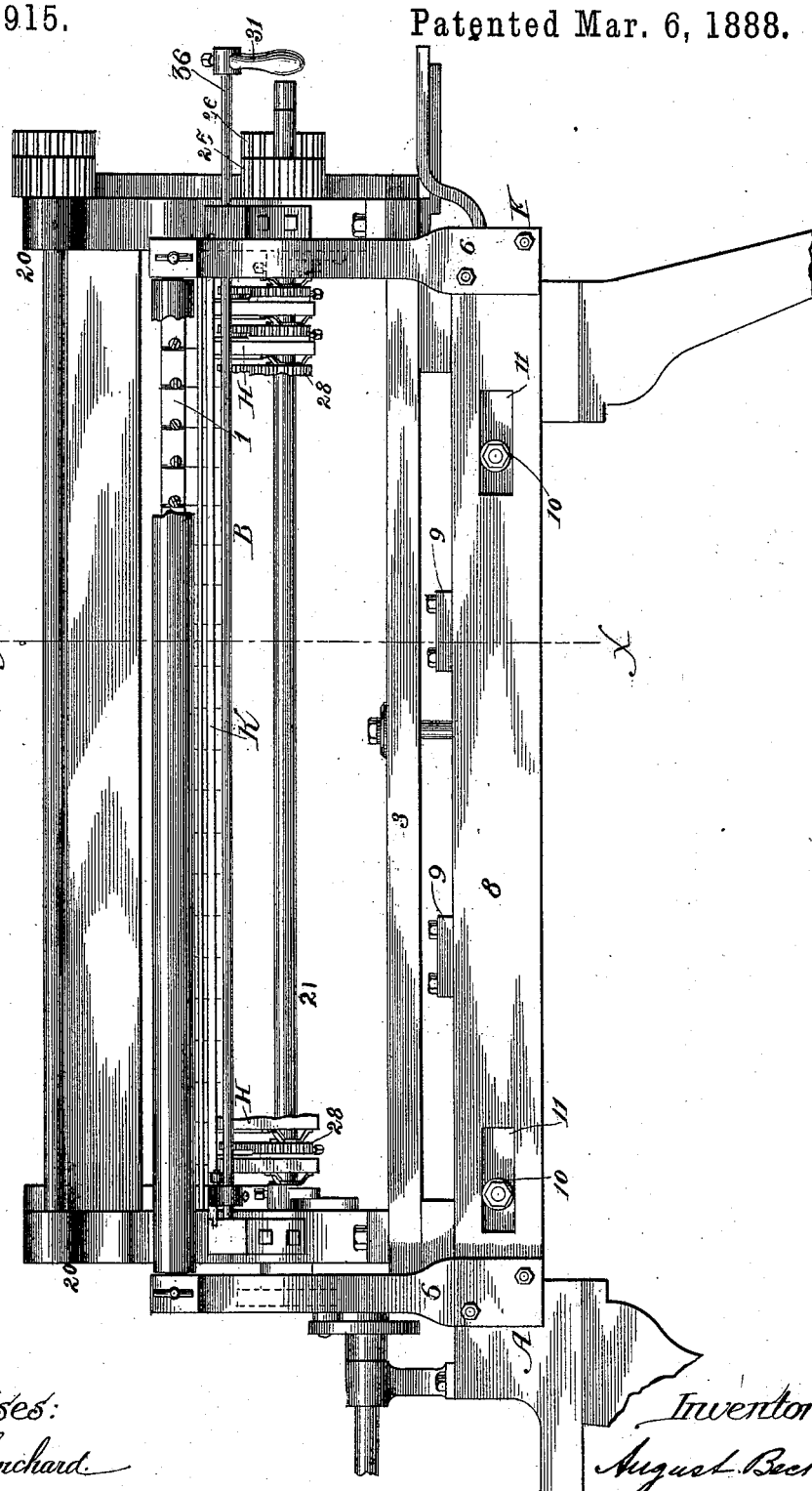

(No Model.) 6 Sheets—Sheet 1.

A. BECK.
QUILTING MACHINE.

No. 378,915. Patented Mar. 6, 1888.

Witnesses:
Frank Blanchard
Anton Schoeninger

Inventor:
August Beck,
By Wm. H. Lotz
Attorney.

(No Model.)

6 Sheets—Sheet 2.

A. BECK.
QUILTING MACHINE.

No. 378,915. Patented Mar. 6, 1888.

Witnesses:
Frank J. Blanchard
Anton Schoeninger

Inventor:
August Beck
By Wm. H. Lotz
Attorney (No Model.) 6 Sheets—Sheet 3.
A. BECK.
QUILTING MACHINE.
No. 378,915. Patented Mar. 6, 1888.
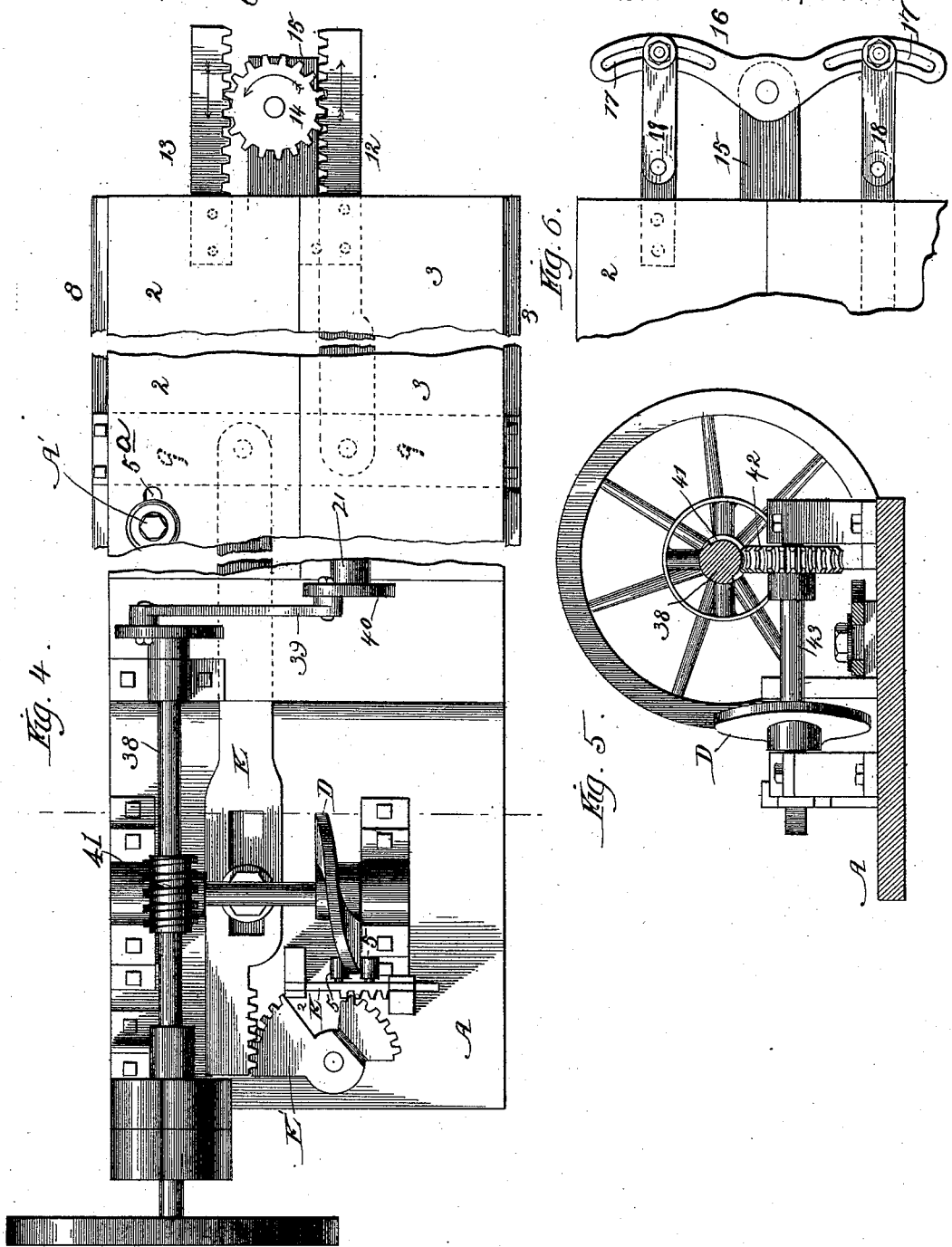

(No Model.) 6 Sheets—Sheet 4.
A. BECK.
QUILTING MACHINE.
No. 378,915. Patented Mar. 6, 1888.
Fig. 7.
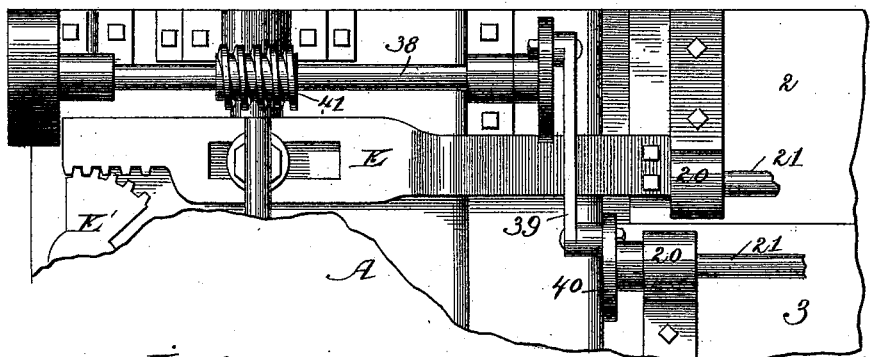
Fig. 8. Fig. 9.
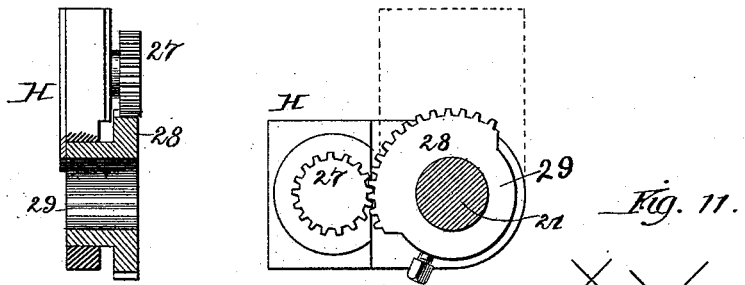
Fig. 10.
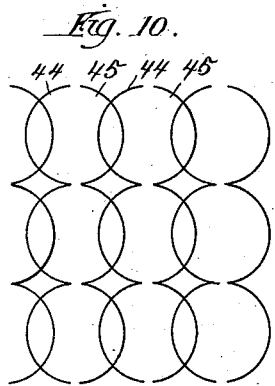
Fig. 12.
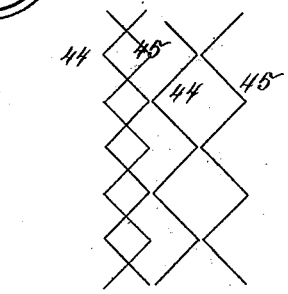
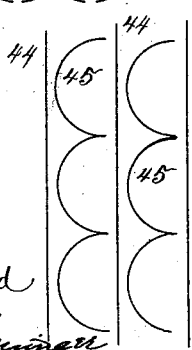
Witnesses:
Frank J Blanchard
Anton Scheuninger
Inventor:
August Beck.
By Wm H. Lotz
Atty.

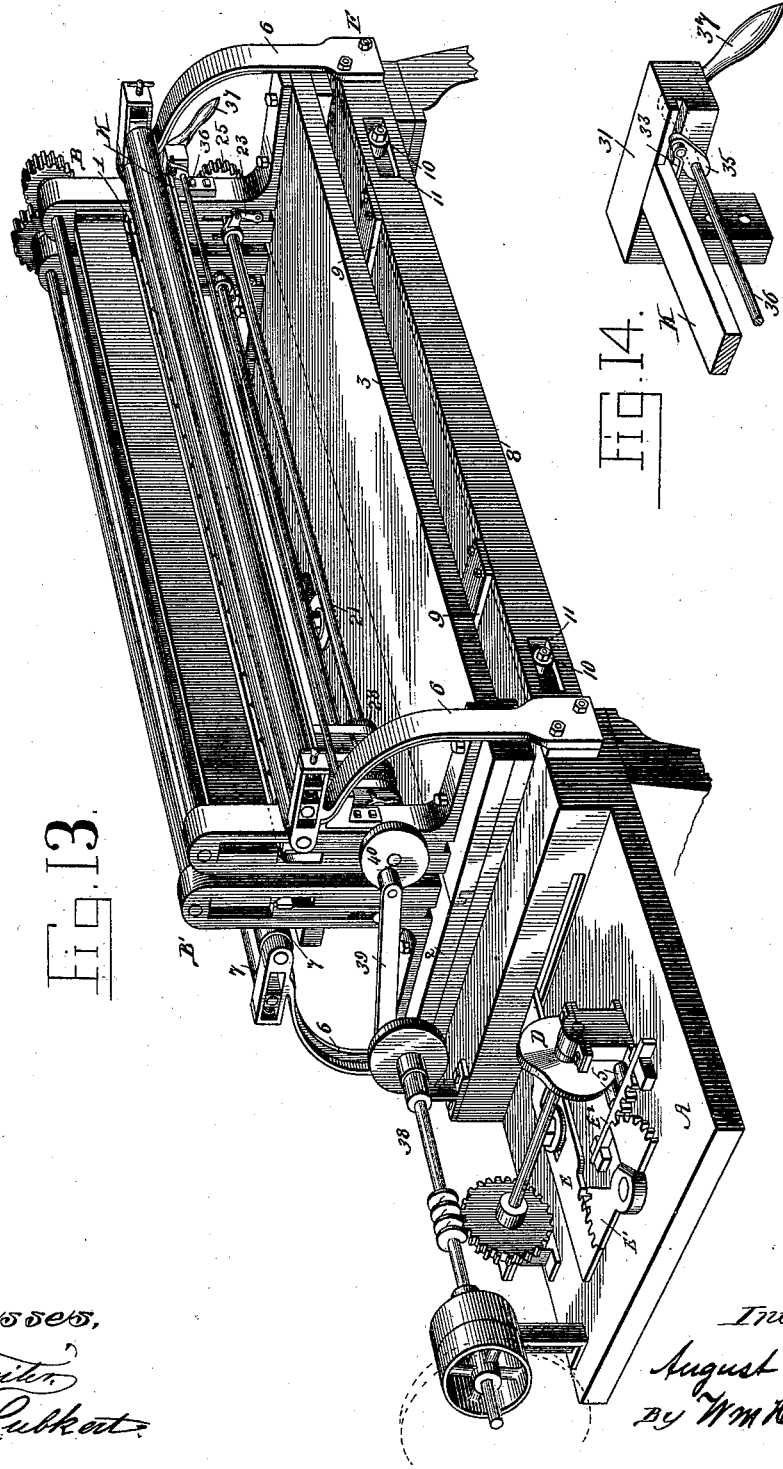

(No Model.) 6 Sheets—Sheet 6.
A. BECK.
QUILTING MACHINE.
No. 378,915. Patented Mar. 6, 1888.
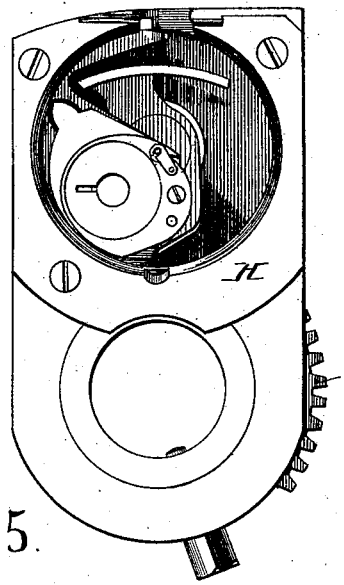
Fig.15.
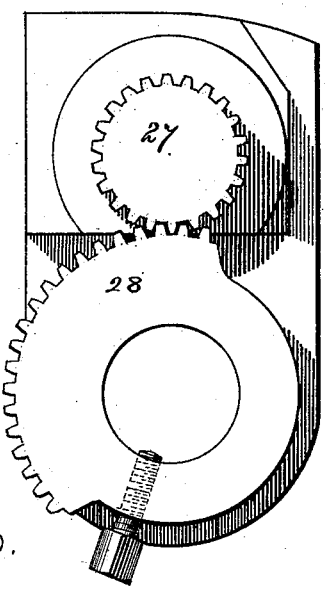
Fig.16.
Fig.17.
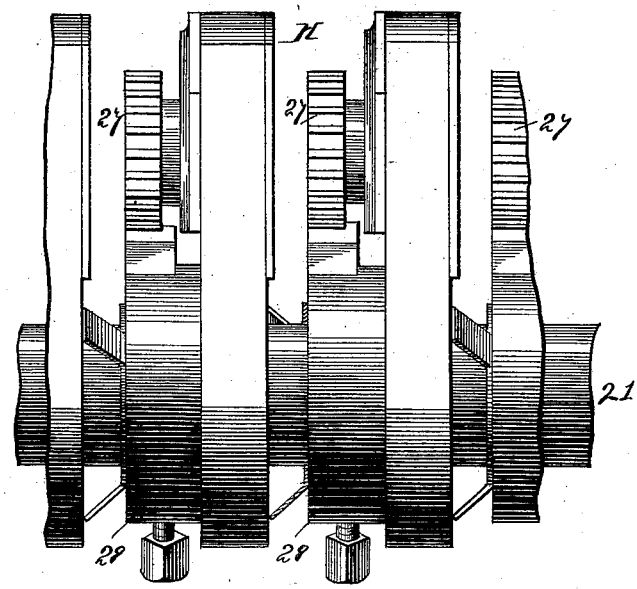
Fig.18.
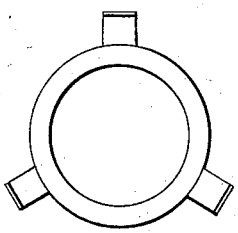
Witnesses.
Otto Lubkert.
A. Maritzen
Inventor.
August Beck.
By Wm H. Lotz.
Attorney.

UNITED STATES PATENT OFFICE.

AUGUST BECK, OF CHICAGO, ILLINOIS.

QUILTING-MACHINE.

SPECIFICATION forming part of Letters Patent No. 378,915, dated March 6, 1888.

Application filed May 4, 1886. Serial No. 201,044. (No model.)

*To all whom it may concern:*

Be it known that I, AUGUST BECK, a citizen of the United States of America, residing at Chicago, in the county of Cook and State of Illinois, have invented certain new and useful Improvements in Quilting-Machines, of which the following is a specification, reference being had therein to the accompanying drawings.

To meet the demands of the trade in quilted fabrics manufacturers of quiltings are called upon to supply a large variety of novel designs, to the attainment of which specially-devised machinery becomes necessary.

My invention relates more particularly to improvements in quilting-machines provided with two parallel rows of needles, and has for its more prominent objects, first, to adapt the machine to produce a greater variety of patterns in stitching than has heretofore been attainable in quilting-machines provided with two parallel rows of needles; second, to simplify and otherwise improve the construction if a quilting-machine susceptible of stitching in various patterns; third, to provide novel and efficient means for operating the shuttle holders or carriers in a manner whereby they can be locked in position to bring the shuttles into operative relationship to the needles, and, when so desired, brought into position to permit the ready removal of the bobbins; finally, to provide certain novel features of construction and combination, all tending to increase the serviceability and general efficiency of a quilting-machine.

A quilting-machine embodying the principles of my invention is provided with two oppositely-arranged sewing-machines, one of which is bodily stationary, while the other is susceptible of reciprocating bodily in a direction transversely to the forward feed of the fabric, which latter is, during the quilting operation, drawn through both sewing-machines. Provision is also made whereby the fabric may, when so desired, be reciprocated transversely to the line of feed, in which case the bodily movements of the reciprocating sewing-machine will be in opposite directions to the transverse movements of the fabric.

By the foregoing arrangement novel and desirable patterns in stitching can be produced and results attained which cannot be attained with two stationary sewing-machines or with a needle-bar provided with two rows of needles combined with means for reciprocating the cloth transversely to the line of feed. Thus when in the present apparatus the cloth is simply drawn forward in a direct line of feed through one bodily-stationary sewing-machine and one bodily-reciprocating sewing-machine, the non-reciprocating sewing-machine will produce straight lines of stitching, while the reciprocating sewing-machine will produce zigzag or wavy lines, according to the kind of cam employed in the mechanism for reciprocating said bodily-movable machine. On the other hand, when, in conjunction with said sewing-machines operating as hereinbefore mentioned, the cloth is reciprocated laterally to and during its forward line of feed, the pattern-lines of stitching produced by the bodily-stationary sewing-machines will correspond with but run the converse or the direct opposite of the pattern-lines of stitching produced by the bodily-reciprocating sewing-machine, as will be hereinafter more fully explained.

Each sewing-machine is provided with a series of oscillatory shuttles corresponding in number to the number of needles. These shuttles are simultaneously oscillated by reciprocating or oscillatory gearing, and the holders or carriers for the shuttles are desirably hung so that they may be held in position to bring the shuttles in operative relationship to the needles and when desired swing out of such position in order that the bobbins when empty can be readily removed.

The details of a quilting-machine embracing all of the aforesaid features are shown in the annexed drawings, in which—

Figure 2:
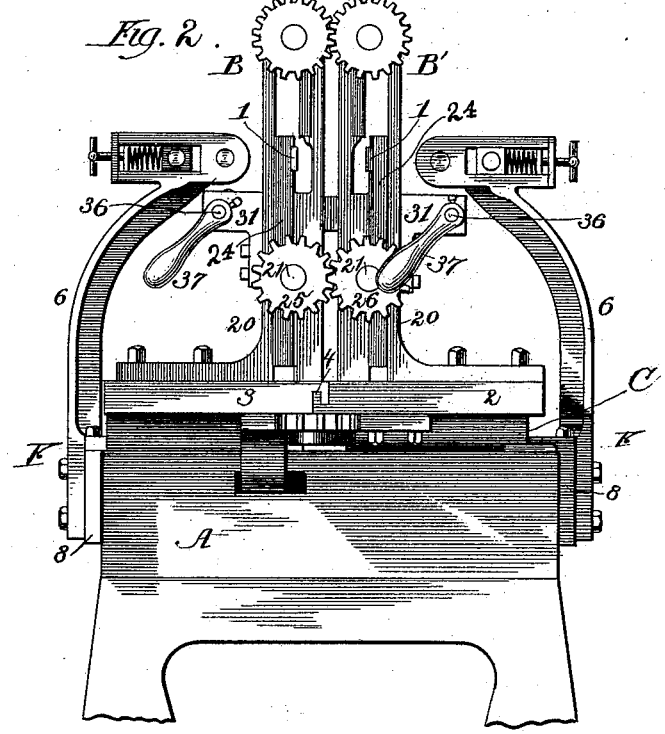
Figure 3:
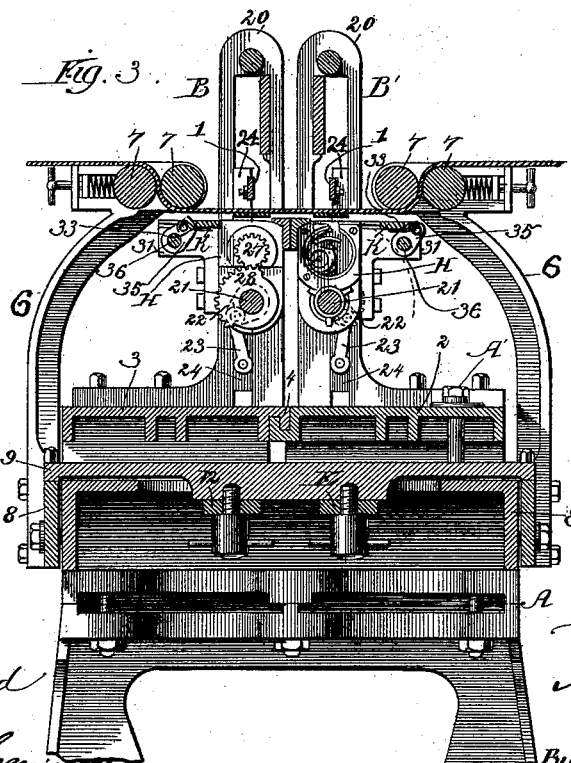

Figure 1 represents a side elevation of the greater portion of the machine with the feed-rollers at this side of the machine partly broken away. Fig. 2 illustrates an end elevation of said machine. Fig. 3 is a transverse vertical section taken on the line $x\,x$, Fig. 1. Fig. 4 is a top plan view of that end portion of the machine which is provided with power mechanism, said view also representing portions of the bed-plate of the two sewing-machines, and also representing, partly in dotted and partly in full lines, the devices for reciprocating one of said sewing-machines. Fig. 5 is an end elevation of a portion of the machine, and serves to represent, principally, the power mechanism employed. Fig. 6 is a detail representing a modification of the device for operating the bodily-reciprocating sewing-machine from the cloth-carriage. Fig. 7 is a top plan view of a portion of the machine, showing the bar E of the power mechanism attached directly to the bodily-reciprocating sewing-machine. Fig. 8 is a detail showing the shuttle carrier or holder in an upright position on the hub of a gear-segment, which latter is shown in section. Fig. 9 represents a side view of said gear-segment on the rock-shaft with the shuttle holder or carrier swung down, said shaft being in section. Figs. 10, 11, and 12 are diagrams illustrating several patterns of stitching which can be made with the present machine. Fig. 13 is a perspective view of the machine. Fig. 14 is a perspective view of portion of the locking-bar and means for operating it. Fig. 15 is a side view of shuttle and carrier. Fig. 16 is a reverse view of Fig. 15. Fig. 17 is a view of a portion of a rock-shaft, showing several shuttle-carriers and operative means for the shuttle arranged thereon. Fig. 18 is a face view of a spacing device or separator to hold the shuttle-carriers at the proper distance apart.

Referring by letter to the several figures of the drawings, in which like letters denote like parts, A indicates the stationary bed-frame, which is suitably constructed with reference to the several parts of the machine that are supported thereon. B designates the one, and B' the other, of the two oppositely-arranged sewing-machines, which are mounted side by side upon the bed-frame, so as to bring their horizontally-disposed and vertically-reciprocating needle-bars 1 in parallel planes, and thus equip the quilting-machine with two rows of needles respectively belonging to one and the other of two separate and distinct sewing-machines. One of these sewing-machines—for example, the one indicated by the letter B—is held stationary upon the bed-frame, while the other sewing-machine, B', is supported so that it can be reciprocated bodily in a direction transverse to the direct forward feed of the fabric that is to be quilted. As an efficient mode of supporting the reciprocating sewing-machine, its base-plate 2 is arranged to rest upon anti-friction rollers C, which in turn rest upon the main bed-frame, as in Fig. 2, wherein one of said rollers is illustrated. The base-plate 3 of the stationary sewing-machine can, however, be bolted down directly upon the bed-frame.

The reciprocating sewing-machine may be guided in any appropriate way—as, for instance, the opposing edge portions of the two sewing-machine base-plates can be provided with interlocking flanges, so as to connect them together by a sliding joint, as at 4, Figs. 2, 3, 14, and 15. The pin or bolt A', herein shown rising from the stationary bed-frame, extends up through a slot, $5^a$, Fig. 4, with which the base-plate of the reciprocating sewing-machine is provided, and serves as an auxiliary for guiding, steadying, and keeping down the said movable base-plate.

The reciprocating movement of the sewing-machine B' is derived from a cam, D, the shape of which may be varied according to the pattern to be stitched. As hereinbefore stated, the support for upholding and guiding the cloth to and from the pair of sewing-machines may be reciprocated simultaneously with but in opposite directions to the bodily movements of the reciprocating sewing-machine; or it may remain stationary while the latter is reciprocated. A great variety of power-transmitting devices for accomplishing such ends would readily suggest themselves to an intelligent mechanic. The means herein shown serve, however, to illustrate a simple and practical way in which the reciprocating mechanism that is actuated by cam D may be applied directly to the reciprocating sewing-machine, or indirectly thereto through the medium of the reciprocating cloth-support.

The reciprocating mechanism shown in Figs. 4, 5, and 13 comprises a longitudinally-reciprocating bar or pitman, E, provided along one end portion with rack-teeth which are engaged by one portion of an oscillatory double segment-gear, E'. The other portion of said gear is engaged by a reciprocating rack, $E^2$, carrying a couple of rollers, 5, which embrace the rotary cam D, whereby the rotation of the latter will, through the medium of said rack $E^2$ and the oscillatory gear E', effect a reciprocatory motion of the bar or pitman E.

Under the arrangement shown in Fig. 4 the said bar or pitman of the reciprocating mechanism is attached directly to the base or body portion of the reciprocatory carriage or support 9, which carries the cloth on its way to and from the pair of sewing-machines, while the desired extent of stroke is imparted to the reciprocating sewing-machine from the said cloth support or carriage by means hereinafter set forth. The cloth support or carriage comprises the two pairs of standards 6 6, which are at their lower ends secured to a sliding base and at their upper ends adapted to support the cloth-rollers 7, that are arranged in pairs, one pair being allotted to each pair of standards. These two pairs of standards are respectively arranged at opposite sides of the pair of sewing-machines, whereby one pair of rollers will guide the material to one sewing-machine, while the oppositely-arranged pair of rollers will guide the material away from the remaining sewing-machine.

The base portion of the cloth carriage or support, as herein constructed, comprises two plates, 8 8, respectively arranged at opposite sides of the bed-frame and connected together by plates or bars 9, which extend across the top of the bed-frame, between which latter and the base-plates of the sewing-machines space (hereinafter referred to) is left for said cross-bars. This cloth-carriage is supported upon anti-friction rollers 10, which are ararranged upon studs on the sides of the bed-frame and which are received in horizontal slots 11, formed through the side plates, 8, of the cloth-carrier.

The reciprocating bar E is conveniently connected with one of the cross-bars 9 of the cloth-carriage, as indicated by dotted lines in Fig. 4, whereby the action of the reciprocating mechanism will serve to reciprocate the cloth-carriage in a direction transversely to the direct line of feed of the cloth.

G, Fig. 4, denotes as a whole a mechanism for actuating the reciprocating sewing-machine from the reciprocating cloth-carriage. Said mechanism comprises a rack-bar, 12, attached to one of the bars 9 of the cloth-carriage, a rack-bar, 13, attached to the base-plate 2 of the reciprocating sewing-machine, and an intermediate gear, 14, which is pivoted upon a fixture, 15, of the bed-frame and arranged to engage the rack-bars 12 and 13. Under such arrangement the relative movement of the members of mechanism G will be as indicated by the arrows. It will be obvious, however, that other analogous devices could be substituted for the gear and rack-bars with the same result—as, for example, in place of the gear I may employ a lever, 16, pivoted between its ends to the fixture 15, and provided along its end portions with the slot 17, in one of which a link, 18, attached to the reciprocating cloth-carriage is pivotally secured, and in the other one of which a link, 19, attached to the reciprocating sewing-machine, is pivotally fastened.

Where it is desired that the cloth-carriage shall remain stationary and the sewing-machine B' alone reciprocated, the mechanism G, or the said equivalent thereof, may be dispensed with or in any suitable way placed in inoperative condition and the bar E attached directly to the base-plate of the reciprocating sewing-machine, as in Fig. 7, in place of being attached to the cloth-carrier. In this last-mentioned arrangement the bar E is suitably bent to permit its attachment to the sewing-machine.

Each sewing-machine is herein provided with a pair of standards, 20, provided with bearings suitable for a rock-shaft, 21, which rock-shafts are operated from a suitably-constructed power mechanism and provided with cams or analogous devices for effecting, through the medium of ordinary or suitable connections, the up-and-down movement of the needle-bars. In the machine herein shown each rock-shaft is provided with two cams, one of which is indicated for each rock-shaft by dotted lines 22, Fig. 3. These cams serve to actuate links 23, which are pivoted to the vertically-sliding end supports, 24, for the needle-bars, said supports being arranged to slide in vertical ways with which the standards of the sewing-machines are provided.

The power mechanism herein shown serves to actuate one rock-shaft, which latter serves in turn to operate the remaining rock-shaft. The transmission of motion from one rock-shaft to the other may be attained by the employment of the two gears 25 and 26, one upon one rock-shaft and one upon the other, said gears being made of sufficient length to keep them in mesh and at the same time permit one sewing-machine to be bodily reciprocated while the other sewing-machine remains stationary.

Each rock-shaft 21 affords a desirable support for a series of shuttle-carriers, H, corresponding in number to the number of needles carried by the needle-bar of the sewing-machine to which said rock-shaft is allotted.

The shuttle-carriers are loosely hung upon the rock-shafts 21, and do not partake of the oscillatory motion of the latter. The rock-shafts, however, serve as pivots about which the shuttle-carriers can be swung when so desired, in which way the shuttle-carriers can be swung up and held in the position shown in Figs. 1 and 8 when it is necessary to bring the shuttles in operative position relative to the needles, and from which position the shuttle-carriers can be swung down, so as to render them accessible for the purpose of taking out and putting in the bobbins, as in Fig. 9.

The type of shuttle herein employed is carried by an oscillatory driver arranged to operate within a circular race formed in the shuttle-carrier or casing H, which for convenience is denominated the "shuttle-carrier." The arbor or spindle of the shuttle, or more properly of the shuttle-driver, is in each instance provided with a gear, 27. These gears can be engaged by and operated from vibratory, reciprocatory, or oscillatory gear devices operated in proper unison with the needles, the preferred arrangement being to secure upon each rock-shaft a series of gear-segments, 28, which engage the gears 27 of the shuttle-drivers. The gear-segments 28 are desirably provided with hubs 29, (see Fig. 8,) secured by set screws to the rock-shaft, and the casings or shuttle-carriers are conveniently hung loosely upon said hubs. The gear-segments 28 and the gears 27 are at all times in mesh, this relationship being preserved whether the shuttle-carriers are in an upright position, as in Fig. 1, for example, or in a lowered position, as in Fig. 9.

The devices for holding the shuttle-carriers in an upright position consist of two horizontally-arranged locking-bars, K, one for each set of shuttle-carriers. These locking-bars have their ends chamfered off and arranged to work in horizontal grooves or guides formed in or upon brackets or bearing-pieces 31, (see Fig. 14,) secured to the standards 20 of the sewing-machines. The locking-bars may be provided with hooks 33, arranged to engage studs upon nuts or blocks 35, secured upon the horizontal rock-shafts 36, as in Fig. 3, one of the said rock-shafts 36 being provided for each sewing-machine. These said rock-shafts 36 are journaled in the brackets or bearings 31, and in Figs. 2 and 3 each rock-shaft is provided with a handle, 37, whereby it can be readily operated for the purpose of shifting laterally the locking-bar K, to which it is allotted.

For the purposes of this invention any suitable construction of oscillatory shuttle can be employed, although that herein shown is of the "Singer" type.

The construction and operation of the several parts of the sewing-machines employed need not be particularly described, since their individual functions are common and well known.

The driving-shaft 38 of the power mechanism is provided with fast and loose pulleys, and carries a crank-lever, 39, which is pivoted at one end eccentrically to a wheel, 40, upon the rock-shaft 21 of the stationary sewing-machine. The driving-shaft 38 is also provided with a worm, 41, engaging a gear, 42, upon the rotary shaft 43, that carries the cam D, in which way the cam can be conveniently driven from the said driving-shaft.

When one of the sewing-machines is reciprocated bodily and the cloth-carriage held stationary, patterns similar to the lines of stitching illustrated in diagrams included in Fig. 12 can be produced, the straight lines of stitching 44 being made by the bodily-stationary sewing-machine, while the curved or zigzag lines 45 are made by the bodily-reciprocating sewing-machine. When, however, the cloth-carriage reciprocates transversely to the line of forward feed simultaneously with the reciprocation of one of the sewing-machines, the lines of stitching can be wrought into patterns such as illustrated in Figs. 10 and 11, wherein the curvatures of the lines 44 made by the stationary sewing-machine are due to the transverse reciprocating movement of the cloth-carrier, while the curved lines 45, made with like curvatures but in position reverse to the curvatures of line 44, are due to the fact that although the reciprocating sewing-machine moves in opposite directions to the movements of the cloth-carriage it moves only about half as fast as the latter, and hence, while one sewing-machine is making a line of stitching one way the other sewing-machine will be making a line of stitching curving in an opposite direction.

The foregoing are only a few of the almost endless variety of patterns that can be made with my present improvement, but will serve to fairly illustrate the same.

For the broader purposes of this invention, the term "sewing-machine," where specified in the claims, is intended to cover a sewing mechanism of any construction suitable for quilting.

What I claim as my invention is—

1. In a quilting-machine, the two vertically-reciprocating needle-bars, combined with a reciprocating support for directing the fabric under the needle-bars, and means for reciprocating one of the needle-bars transversely to the line of feed and simultaneously with but in directions opposite to the movements of the said reciprocating support, substantially as described.

2. The two sewing-machines geared together, whereby one may be operated from the other, combined with means for bodily reciprocating one sewing-machine while the other is held bodily stationary, and with a cloth-carriage and means for reciprocating the same at the same time with but in opposite direction to the reciprocating sewing-machine, substantially as described.

3. The two sewing-machines, one stationary and the other susceptible of a bodily reciprocating movement, combined with the reciprocating cloth-carriage, and a connecting mechanism, substantially as described, between the cloth-carriage and the reciprocating sewing-machine, whereby a movement in one direction of the cloth-carriage shall effect a movement in the opposite direction of the reciprocating sewing-machine, substantially as described.

4. A stationary sewing-machine and a bodily-reciprocating sewing-machine, each machine having a row of needles, the rows being parallel, in combination with the reciprocating cloth-carriage, the pattern-cam, and a reciprocating mechanism, substantially as set forth.

5. The combination, with the two sewing-machines and the cloth-carriage therefor, of mechanism for reciprocating one of the machines and the cloth-carriage, comprising connections to the said machine and cloth-carriage, the reciprocating bar E, the oscillating gear E', the reciprocating rack E², and the rotary cam D, for operating the rack, all constructed and combined for operation substantially as set forth.

In testimony whereof I affix my signature in presence of two witnesses.

AUGUST BECK.

Witnesses:
ANTON SCHOENINGER,
HARRIS W. HUEHL.